United States Patent

Beck et al.

Patent Number: 6,062,528
Date of Patent: *May 16, 2000

[54] PLATE-SHAPED HOLDER

[75] Inventors: Erich Beck, Adelberg; Reinhard Resch, Stuttgart; Harry Tröster, Tamm, all of Germany

[73] Assignee: DaimlerChrysler AG, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/967,942

[22] Filed: Nov. 12, 1997

[30] Foreign Application Priority Data

Dec. 11, 1996 [DE] Germany .............................. 196 46 650

[51] Int. Cl.$^7$ ...................................................... F16M 1/00
[52] U.S. Cl. ........................................ 248/674; 248/224.8
[58] Field of Search ............................... 248/674, 220.41, 248/224.8, 231.9

[56] References Cited

U.S. PATENT DOCUMENTS

| 4,672,732 | 6/1987 | Ramspacher et al. ..................... 29/429 |
| 5,524,860 | 6/1996 | Ives .......................................... 248/674 |

FOREIGN PATENT DOCUMENTS

| 43 24 099 C1 | 7/1994 | Germany . |
| 195 02 999 | 8/1995 | Germany . |
| 44 47 312 | 7/1996 | Germany . |

OTHER PUBLICATIONS

Patent Abstracts of Japan, vol. 096, No. 007; JP 08 061437, Amashiro Chitose, Mar. 8, 1996.

*Primary Examiner*—Terry Lee Melius
*Assistant Examiner*—David E. Bochna
*Attorney, Agent, or Firm*—Edwards, McKeown, Evenson, & Lenahan, P.L.L.C.

[57] ABSTRACT

A plate-shaped holder for holding a first component on a supporting part, including a base plate, devices arranged on the base plate for fastening the holder on the first component, and devices arranged on the base plate for mounting the holder on the supporting part. The devices for fastening the holder on the first component contain a fastening bolt guide which projects from a first side of the base plate. A fastening bolt is fitted through the fastening bolt guide from the other, second base plate side, as a single fastening element between the holder and the first component. The free front end of the fastening bolt guide forms a first support point for the first component. Several supporting pins project from the first base plate side which form, by means of their free front ends, additional support points for the first component and of which two form a tilt-stabilizing triangle together with the first support point.

10 Claims, 4 Drawing Sheets

PLATE-SHAPED HOLDER

BACKGROUND AND SUMMARY OF THE INVENTION

This application claims the priority of German patent application 19646650.4, the disclosure of which is expressly incorporated by reference herein.

The invention relates to a plate-shaped holder for holding a first component on a second component in the form of a supporting part, particularly for holding a hydraulic system on a vehicle body, having a base plate, devices arranged on the base plate for fastening the holder on the first component and devices arranged on the base plate for mounting the holder on the supporting part.

Plate-shaped holders for holding a first component on a second component are known and are used, for example, when a direct mounting of a first component on a supporting part is not easily possible or expedient. This may be the case, for example, when fastening hydraulic systems on vehicle bodies if the back side of the section of the vehicle body intended for the fastening is not accessible or can be accessed only with difficulty; when the limited surface loadability of the vehicle body section requires an enlargement of the fastening surface with respect to the fastening surface existing on the hydraulic system; or when the fastening possibilities provided on the hydraulic system do not allow a vibration-insulated bearing in rubber elements.

German Patent Document DE 44 47 312 A1 describes a device for fastening a glass body, for example, on a wall which contains a mounting plate consisting of a base plate on which devices are arranged for fastening the mounting plate on the glass body and devices for mounting the mounting plate on the wall or the like. As devices for fastening the mounting plate on the first component, a bore is provided which penetrates the base plate and acts as a stud guide, and a fastening screw is provided which is fitted through this bore and which is screwed into a corresponding threaded sleeve on the glass body.

German Patent Document DE 195 02 999 A1 describes a device for the installation of a reserve tank or an expansion tank in a vehicle body which contains two mutually displaceable holding parts, of which one is connected with the tank and the other is connected with the vehicle body. The latter holding part has a flat, plate-shaped main part as well as opposite wing parts which extend toward the outside from the flat main part. In its main part, this holding part has a U-shaped cutout and a pair of spaced edges whereby it can be detachably connected by means of sliding with the other holding part. On the wing parts, cutouts are worked in for receiving fastening parts by means of which the holding part can be fixed on the vehicle body.

The invention is based on the technical problem of providing a holder which has a simple construction and permits a holding of a first component on a supporting part which is stable with respect to tilting and preferably also rotating and can be easily mounted and demounted.

These and other problems have been solved according to the present invention by providing a plate-shaped holder for holding a first component on a supporting part, comprising: a base plate; devices arranged on the base plate for fastening the base plate to said first component; and devices arranged on the base plate for mounting the holder on said supporting part, said devices for fastening the holder on the first component including a fastening bolt guide projecting from a first side of the base plate, and a fastening bolt fitted through the fastening bolt guide as a single fastening element between the base plate and the first component, a free front end of the fastening bolt guide forming a first support point for the first component, and several supporting pins projecting from the first side of the base plate side which have free front ends which form additional support points for the first component, two of which forming a tilt-stabilizing triangle with the first support point.

These and other problems have been solved according to the present invention by providing a one-piece base plate for connection of a component to a supporting part, said base plate being generally plate-shaped with a thickness defined by oppositely disposed first and second sides, said base plate defining a fastening bolt guide opening through said thickness and projecting from said first side to an end face to be engaged with said component, said base plate defining a plurality of supporting pins projecting from said first side to respective end faces to be engaged with said component, said base plate defining a plurality of projections extending from said second side of the base plate to be engaged with said supporting part.

According to the present invention, the devices for fastening the holder on the first component have a fastening bolt guide which projects from a first side of the base plate and a fastening bolt which is fitted through the fastening bolt guide as the only fastening element between the holder and the first component. As a result, the holder can be mounted on the first component and can be demounted from it rapidly and easily. The free front end of the fastening bolt guide forms a first support point for the first component, and, in addition, several support pins project from the first base plate side which, by means of their free front ends, form additional support points for the first component, and of which two form a tilt-stabilizing triangle with the first support point. It is demonstrated that this ensures a fastening of the relatively simply constructed holder on the first component which is stable with respect to tilting, which first component can therefore be held on the supporting part in a correspondingly stable manner with respect to tilting.

According to one embodiment of the invention, the free front end of the fastening bolt guide concentrically surrounds the fastening bolt. As a result, a well stabilizing supporting point is created in the form of a concentric supporting surface which contributes to securing the holder against a tilting about tilting axes which are perpendicular to the longitudinal axis of the bolt.

According to another embodiment of the invention, the devices for fastening the holder on the first component have at least one fixing pin which projects from the first side of the base plate and which engages in a pertaining recess on the first component. This reliably protects the holder against rotations with respect to the first component, and simultaneously ensures a precise positioning of the holder on the first component.

According to another embodiment of the invention, the devices for mounting the holder on the supporting part have taper plugs which project from the second side of the base plate and which can be fitted into assigned rubber sleeves of the supporting part. The resulting plug-in capacity of the connection of the holder and the supporting part, while the construction of the holder is simple, ensures a simple and fast demountability. By the use of rubber sleeves on the supporting part, a vibration-insulated holding of the first component on the supporting part is ensured.

According to another embodiment of the invention the taper plugs are designed with a rearward section facing the base plate which is designed as a supporting cone and forms a stop surface for a matching conical ring surface of the rubber sleeve, with a cylindrical center section which interacts in a frictionally engaged manner with a center section of the respective rubber sleeve, and with a forward section which carries a retaining collar which interacts in an unbuttoning manner with the respective rubber sleeve. The mounting of the holder on the supporting part takes place by a simple introduction of the taper plugs into the rubber sleeves, in the case of which only the friction of the retaining collars must be overcome during the sliding through the rubber sleeve. The end position is reliably determined by the stop face, and the secure fit of the holder together with the first component in the rubber sleeves of the supporting part is ensured by the reaching-behind unbuttoning of the retaining collar from the rubber sleeves.

According to another embodiment of the invention, the fastening devices for the holder have a fastening screw with a pertaining guide or a stud bolt with a pertaining guide and a spring element which can be fixed on the stud bolt and which holds the holder under prestress on the first component.

Other objects, advantages and novel features of the present invention will become apparent from the following detailed description of the invention when considered in conjunction with the accompanying drawings.

DETAILED DESCRIPTION OF THE DRAWINGS

Figure 1:
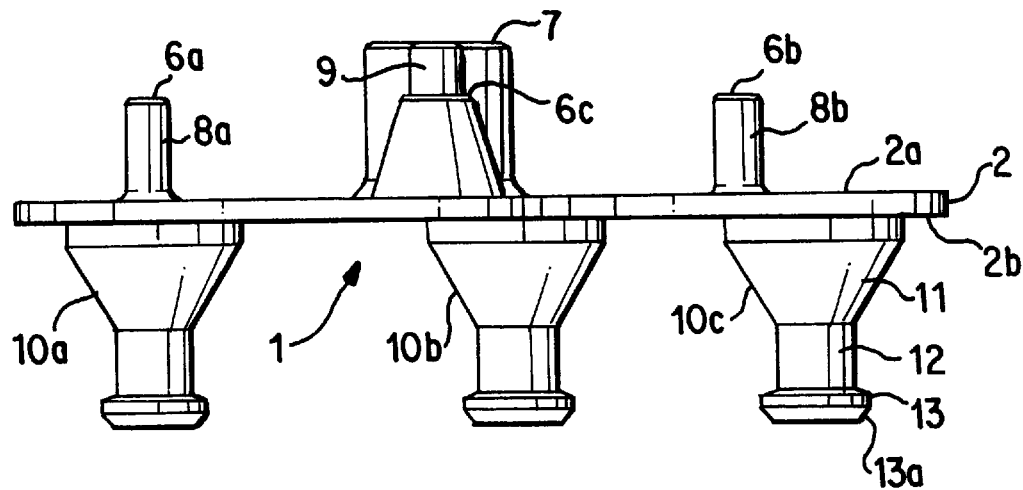
FIG. 1 is a lateral view of a plate-shaped holder according to a preferred embodiment of the present invention.
Figure 4:
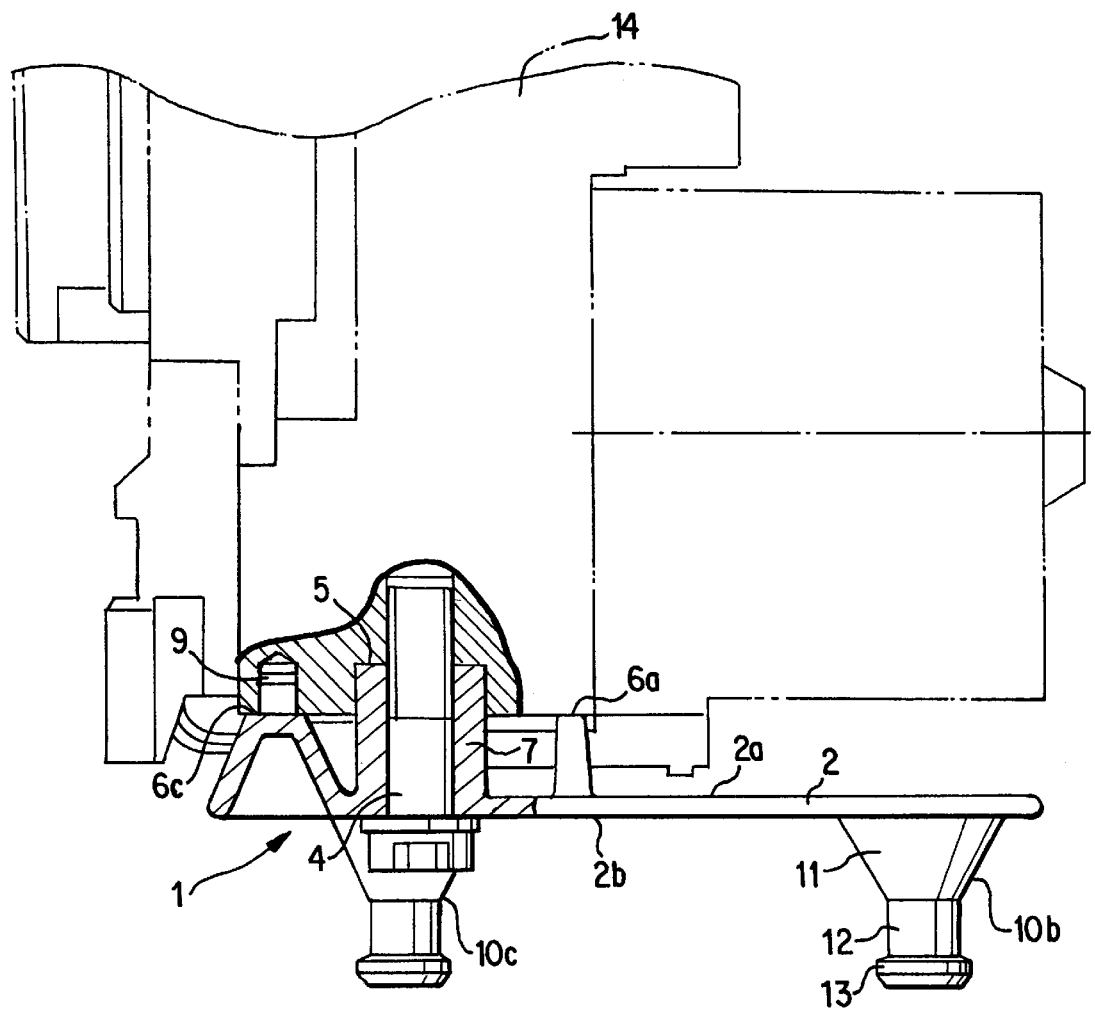
FIG. 4 is a partially cut-away lateral view of the holder fastened to a schematically illustrated hydraulic system of a motor vehicle.
Figure 5:
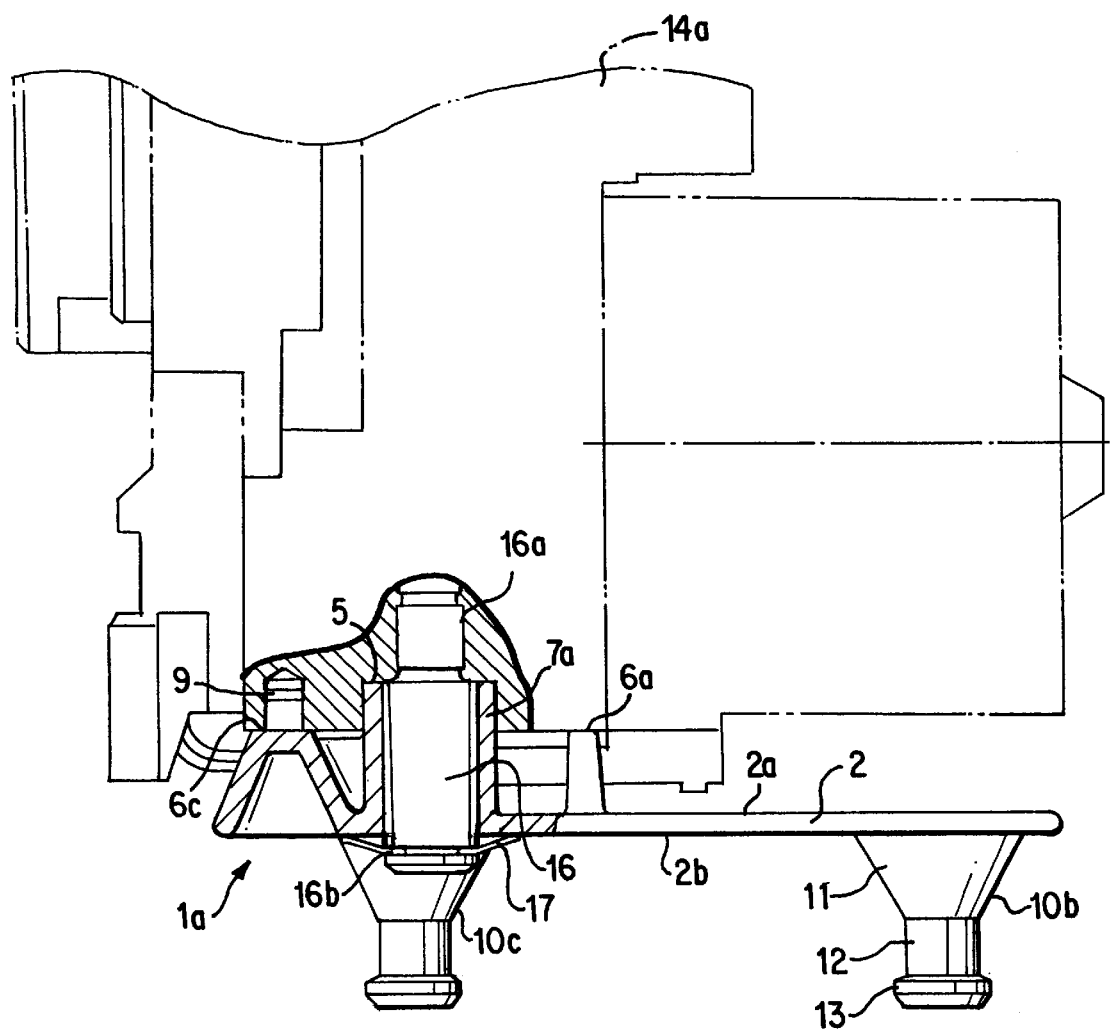
FIG. 5 is a partially cut-away lateral view of the holder fastened to a modified hydraulic system holding device.

FIG. 1 is lateral view of a plate-shaped holder 1 for fastening a hydraulic system 14, 14a schematically shown in FIGS. 4 and 5 to a rubber sleeve 18 of vehicle body. The holder has a base plate 2, a fastening bolt guide 7 projecting from a first side 2a of the base plate 2, and two support pins 8a, 8b which also project from the first side of the base plate and whose free front ends 6a, 6b form two support points for the fastening of the holder 1 on the hydraulic system 14. In addition, a fixing pin 9 projects from the first side 2a of the base plate 2 and is used for securing the holder 1 with respect to rotation and positioning the holder 1 precisely on the hydraulic system 14. Three taper plugs 10a, 10b and 10c project from the second side 2b of the base plate 2 and are fitted into rubber sleeves 18 of the vehicle body. In the present embodiment, the holder 1 is constructed in one piece, for example, as an injection-molded metal or plastic part.

Figure 2:
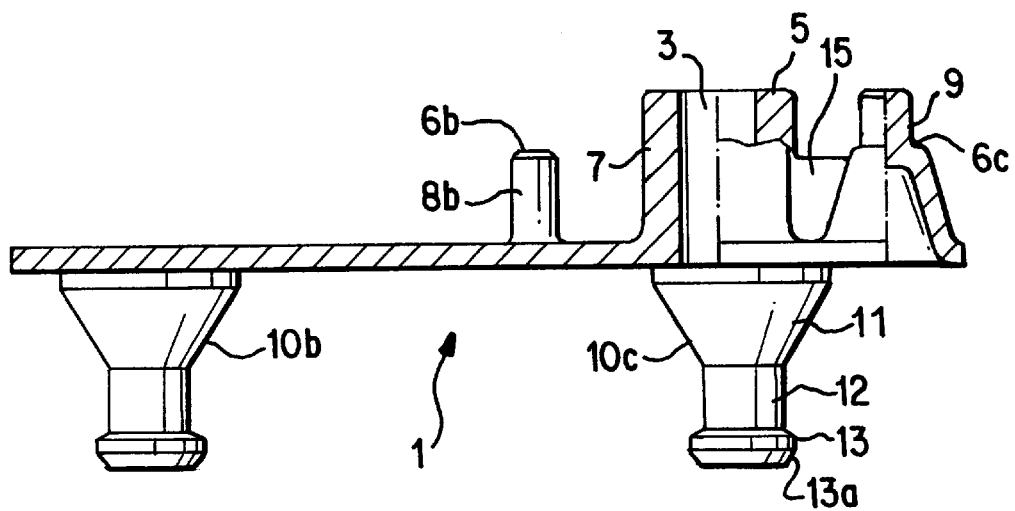
FIG. 2 is a sectional view of the holder.

The sectional view of FIG. 2 shows that the fastening bolt guide 7 has a bore 3 through which a pertaining fastening bolt can be fitted from the second side 2b of the base plate, as illustrated in FIG. 4. The face 5 of the fastening bolt guide 7 forms a first support point concentrically surrounding the bore 3. Additional support points are formed by the free front ends 6a, 6b of the two support pins 8a, 8b. Another support point is formed by a ring shoulder 6c which is constructed on the fixing pin 9. Between the fixing pin 9 and the fastening bolt guide 7, a reinforcing rib 15 is provided which ensures a precise positioning of the fixing pin 9 with respect to the fastening bolt guide 7.

Figure 3:
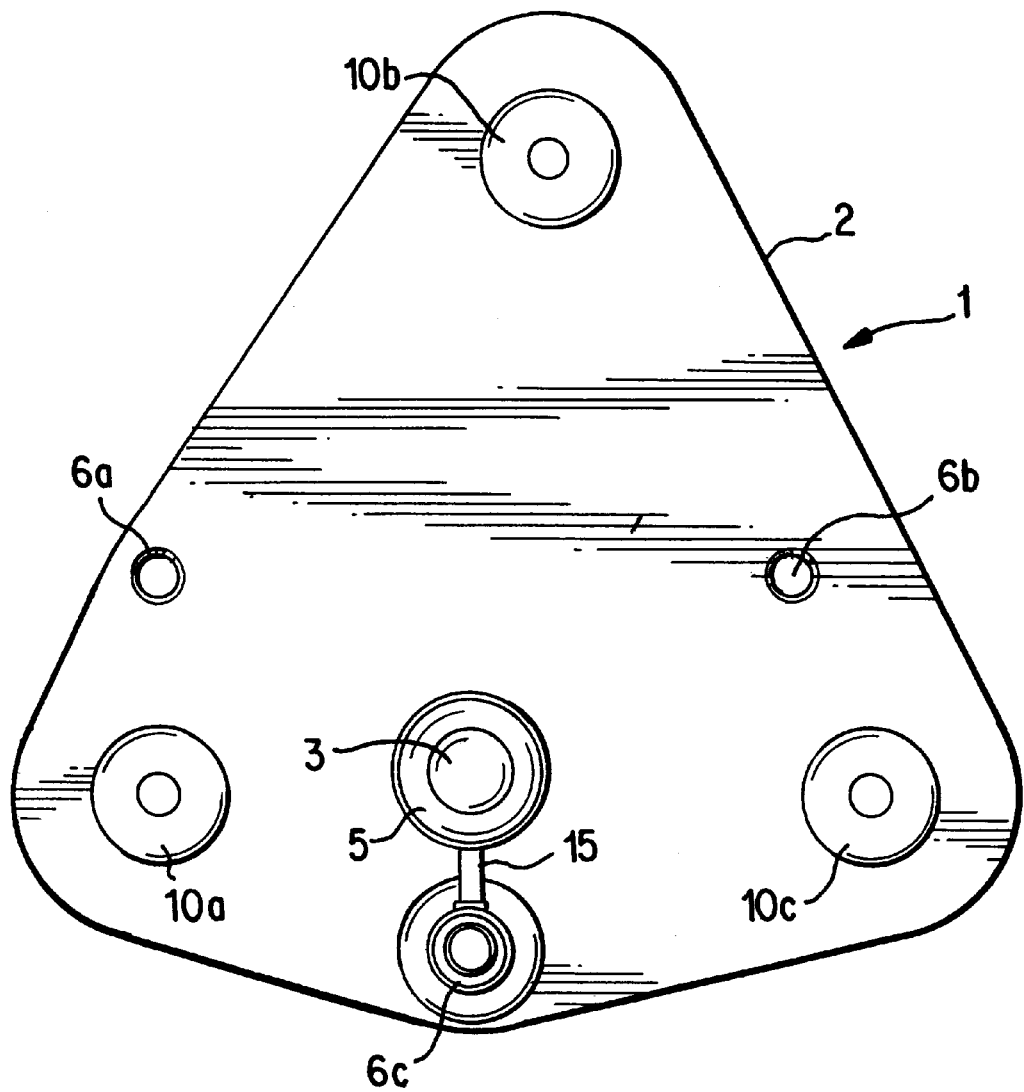
FIG. 3 is a top view of the holder.

The top view of the holder in FIG. 3 shows more precisely that the face 5 of the fastening bolt guide 7 concentrically surrounds the bore 3 extending through the base plate 2 and the fastening bolt guide 7, which, in connection with the fastening bolt 4, already provides a certain protection against a tilting for the holder-hydraulic system fastening about the tilting axis perpendicularly to the longitudinal axis of the fastening bolt 4. The faces 6a, 6b of the support pins 8a, 8b, which are also provided for the support, form, together with the face 5 of the fastening bolt guide 7, a tilt-stabilizing triangle. The ring shoulder constructed on the fixing pin 9 also contributes to an increased stabilizing with respect to tilting. FIG. 3 also shows the position of the taper plugs 10a, 10b and 10c which also form a triangle, in which case one of the support points of the support pins 8a, 8b and of the fastening bolt guide 7 or of the fixing pin 9 respectively is situated in the respective area between two taper plugs. This arrangement permits a stable holding of the hydraulic system 14 on the vehicle body.

FIG. 4 shows the holder 1 in its position fixed on the schematically illustrated hydraulic system 14, in which case the parts of the holder 1 and of the hydraulic system 14 are cut open to illustrate the fastening. The fastening bolt 4 is fitted from the second base plate side 2b through the fastening bolt guide 7 and engages in a matching threaded bore in the hydraulic system 14. By tightening the fastening bolt 4, a tension force is generated between the holder 1 and the hydraulic system 14 by means of which the hydraulic system comes to rest by means of corresponding housing sections against the face 5 of the fastening bolt guide 7, against the faces 6a, 6b of the support pins 8a, 8b and against the ring shoulder 6c provided on the fixing pin 9. As a result, a reliable support of the holder 1 on the hydraulic system 14 is ensured which is stable with respect to tilting. In the area of the fixing pins 9, the hydraulic system 14 is illustrated in a cut-open manner. As a result, it can be recognized that the fixing pin 9 engages in a pertaining recess on the hydraulic system 14 and thus secures the holder 1 with respect to a rotation with respect to the hydraulic system 14 about the longitudinal axis of the fastening bolt 4. It is demonstrated that this ensures a fastening of the holder 1 on the hydraulic system 14 which is stable with respect to rotation and tilting. At the same time, by using only a single fastening bolt, an easy and rapid mountability and demountability of the simply constructed holder 1 is achieved on the hydraulic system 14.

FIG. 4 shows two 10a, 10b of the three taper plugs 10a, 10b, 10c projecting away from the second base plate side 2b, which taper plugs interact with rubber sleeves 18 of the vehicle body. For this purpose, as illustrated in FIGS. 1 and 2, the taper plugs 10a, 10b, 10c each have a support cone 11 in a section adjacent the base plate 2. The support cone 11 provides a stop surface for a matching conical ring surface of a pertaining rubber sleeve 18. The support cone 11 is adjoined by a center section 12 of a cylindrical shape which interacts in a frictionally engaging manner with the center section of the rubber sleeve 18. Each taper plug 10a, 10b, 10c is closed off by a retaining collar 13.

In the present embodiment, it is provided to first fasten the holder 1 on the hydraulic system 14 according to FIG. 4 and then mount the mounting unit consisting of the holder 1 and the hydraulic system 14 on the vehicle body. For this purpose, the taper plugs 10, 10b and 10c are fitted into the respectively assigned rubber sleeves 18 on the vehicle body side. The inlet-side conical ring surfaces of the rubber sleeves 18 permit a correct positioning of the holder 1 and, in addition, facilitate the introduction of the retaining collars 13 into the rubber sleeves 18. In order to further facilitate the latter, each retaining collar 13 is provided with a conical ring surface 13a on its front side facing away from the base plate 2. By exercising a plug-in force onto the holder 1 which acts in the direction of the vehicle body, the respective retaining collar 13 is introduced into the center section of the rubber sleeve 18. When the retaining collar 13 is pushed through the rubber sleeve 18, only the frictional resistance between the retaining collar and the rubber sleeve 18 must be overcome. At the end of the rubber sleeve 18 opposite the conical ring surface, the retaining collar 13 will leave this rubber sleeve 18 again in an unbuttoning manner, for the purpose of which its outside diameter is selected to be larger than the outlet-side minimal inside diameter of the rubber sleeve 18.

In this mounting position of the taper plugs 10a, 10b, 10c in the rubber sleeves 18, the support cones 11 of the taper plugs 10a, 10b, 10c will now also interact with the matching conical ring surfaces of the rubber sleeves 18. As a result, the simply constructed holder 1 with the hydraulic system 14 fastened to it is mounted in a defined position securely on the vehicle body and is held on it by the frictional force between the respective center sections 12 of the taper plugs 10a, 10b, 10c and the rubber sleeves 18 and mainly by the retaining collars 13 unbuttoned from the rubber sleeves 18. By means of the rubber sleeves 18, a vibration-insulated bearing is also implemented. The removal of the holder 1 together with the hydraulic system from the vehicle body takes place in a simple manner by an unplugging force directed away from the vehicle body.

A variant of the hydraulic system holding device of FIG. 4 is illustrated in FIG. 5 in which functionally identical elements are provided with the same reference numbers and reference can be made to the description of FIG. 4 with respect to the description of FIG. 5. In contrast to the holding device of FIG. 4, that of FIG. 5 contains a stud bolt 16 as a fastening bolt which has a thread 16a on the side facing the hydraulic system 14a, by way of which thread 16a it is fixed on the hydraulic system 14a. As an alternative, the stud bolt 16 can also be fixedly mounted on the hydraulic system 14a in a different manner. The stud bolt 16 is fitted through a pertaining stud bolt guide 7a of the holder 1a which to this extent is modified with respect to that of FIG. 4, and projects with respect to its base plate 2 by means of its free front end area into which a circumference-side ring groove 16 is machined. A spring plate 17 is received in this ring groove 16b in an axially secured manner and permanently presses the holder 1a under prestress against the hydraulic system 14a and thus securely fixes it there. Furthermore, all advantageous functional characteristics explained above with respect to FIG. 4 apply to this holder-hydraulic system fastening.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An assembly, comprising:
   a plate-shaped holder for holding a hydraulic system on a motor vehicle body, wherein the plate-shape holder comprises:
   a base plate;
   devices attached to the base plate for fastening the base plate to said hydraulic system; and
   devices attached to the base plate for mounting the holder on said motor vehicle body,
   said devices for fastening the holder on the hydraulic system include only one fastening bolt guide projecting from a first side of the base plate, and a fastening bolt fitted through the fastening bolt guide as a single fastening element between the base plate and the hydraulic system; and several supporting pins projecting from the first side of the base plate which have free ends from which form additional support points for the hydraulic system, two of which forming a tilt-stabilizing triangle with the first support.

2. A plate-shaped holder according to claim 1, wherein the free front end of the fastening bolt guide concentrically surrounds the fastening bolt.

3. A plate-shaped holder according to claim 1, wherein the devices for fastening the holder on the hydraulic system have at least one fixing pin which projects from the first side of the base plate and which engages in a corresponding recess on the first component.

4. A plate-shaped holder according to claim 1, wherein the devices for mounting the holder on the supporting part comprise taper plugs which project from a second side of the base plate located opposite said first side and which are pluggable into corresponding rubber sleeves of the motor vehicle body.

5. A plate-shaped holder according to claim 5, wherein the taper plugs have a conical section and a cylindrical section, said conical section extending from a location adjacent the base plate as a supporting cone and which forms a stop face for a matching conical ring surface of the rubber sleeves, said cylindrical section frictionally engaging a center section of the rubber sleeves, and a forward section which carries a retaining collar which interacts in a buttoning/unbuttoning manner with the respective rubber sleeve.

6. A plate-shaped holder according to claim 1, wherein a fastening bolt guide or a stud bolt guide is provided as the fastening bolt guide projecting from the first base plate side and correspondingly, as a fastening bolt, a fastening bolt is provided which is fitted through the guide from the other base plate side or a stud bolt is provided which is fixed on the hydraulic system and which has a groove in which a spring element can be received which presses the holder under prestress against the first component.

7. A one-piece base plate for connection of a hydraulic system to a motor vehicle body, said base plate being generally plate-shaped with a thickness defined by oppositely disposed first and second sides, said base plate defining only a single fastening bolt guide opening through said thickness and projecting from said first side to an end face to be engaged with said hydraulic system, said base plate defining a plurality of supporting pins projecting from said first side to respective end faces to be engaged with said hydraulic system, said base plate defining a plurality of projections extending from side second side of the base plate to be engaged with said motor vehicle body.

8. A one-piece base plate according to claim 7, wherein said plurality of projections comprise taper plugs, said taper plugs each having a conical section extending from said second side with a decreasing conical radius, a cylindrical section extending from said conical section, and a retaining collar adjacent said cylindrical section and having a diameter larger than that of said cylindrical section.

9. A one-piece base plate according to claim 8, wherein said base plate further defines at least one fixing pin which projects from said first side of the base plate to be engaged in a corresponding recess in the hydraulic system.

10. A one-piece base plate according to claim 7, wherein said base plate further defines at least one fixing pin which projects from said first side of the base plate 2 to be engaged in a corresponding recess in the hydraulic system.

* * * * *